US00RE43074E

(19) United States
(12) Reissued Patent
Shahana

(10) Patent Number: US RE43,074 E
(45) **Date of Reissued Patent: *Jan. 10, 2012**

(54) BICYCLE SHIFT DEVICE HAVING A LINEARLY SLIDING SHIFT LEVER OPERATED BY A PIVOTING COVER

(75) Inventor: Satoshi Shahana, Osaka (JP)

(73) Assignee: Shimano, Inc., Sakai-ku, Sakai (JP)

( * ) Notice: This patent is subject to a terminal disclaimer.

(21) Appl. No.: 11/389,658

(22) Filed: Mar. 22, 2006

Related U.S. Patent Documents

Reissue of:
(64) Patent No.: 6,450,060
Issued: Sep. 17, 2002
Appl. No.: 09/527,759
Filed: Mar. 17, 2000

(51) Int. Cl.
*F16C 1/10* (2006.01)
(52) U.S. Cl. ..... 74/502.2; 74/502
(58) Field of Classification Search ..... 74/473.14, 74/489, 501.6, 502, 502.2; *B62M 25/04*
See application file for complete search history.

(56) References Cited

U.S. PATENT DOCUMENTS

| | | | | |
|---|---|---|---|---|
| 4,900,291 A | | 2/1990 | Patterson | 474/80 |
| 5,012,692 A | | 5/1991 | Nagano | 74/475 |
| 5,095,768 A | | 3/1992 | Nagano | 74/475 |
| 5,102,372 A | | 4/1992 | Patterson et al. | 474/80 |
| 5,203,213 A | | 4/1993 | Nagano | 74/475 |
| 5,257,683 A | * | 11/1993 | Romano | 192/217 |
| 5,421,219 A | | 6/1995 | Tagawa et al. | 74/502.2 |
| 5,438,889 A | * | 8/1995 | Tagawa | 74/473.14 |
| 5,622,083 A | * | 4/1997 | Kirimoto et al. | 74/473.21 |
| 5,664,543 A | * | 9/1997 | Taomo et al. | 74/501.6 |
| 5,755,139 A | | 5/1998 | Kojima | 74/475 |
| 5,758,546 A | * | 6/1998 | Taomo et al. | 74/501.6 |

(Continued)

FOREIGN PATENT DOCUMENTS

| | | |
|---|---|---|
| DE | 3200562 A1 | 7/1983 |
| DE | 3826635 A1 | 2/1990 |
| FR | 977332 | 3/1951 |

(Continued)

OTHER PUBLICATIONS

Shimano Bicycle System Components catalog; Apr. 1982; p. 120.

*Primary Examiner* — Vinh Luong
(74) *Attorney, Agent, or Firm* — James A. Deland

(57) ABSTRACT

A bicycle shift control device is provided which operates a shifting mechanism via a shift control cable, wherein the shift control device includes a control body rotatable about an axis for controlling the shift control cable, an operating body having an abutment in a position spaced apart from the control body and which is coupled to the shift control device for displacement between a home position and a shift position, a transmission including a plurality of ratchet teeth which converts the displacement of the operating body from the home position to the shift position into a rotational displacement of the control body, and an interface member movably mounted relative to the operating body. The interface member has an operating force receiving surface and an operating force applying surface, wherein the operating force receiving surface is adapted to receive an operating force from the rider, and wherein the operating surface applying surface applies the operating force to the abutment of the operating body for moving the operating body from the home position to the shift position.

19 Claims, 4 Drawing Sheets

U.S. PATENT DOCUMENTS

| | | | | |
|---|---|---|---|---|
| 5,775,168 | A | 7/1998 | Furuta | 74/489 |
| 5,799,542 | A | 9/1998 | Yamane | 74/489 |
| 5,921,138 | A | 7/1999 | Kojima et al. | 74/473.13 |
| 6,112,614 | A * | 9/2000 | Yamashita | 74/489 |
| 7,146,874 | B2 * | 12/2006 | Shahana et al. | 74/502.2 |
| 2006/0070478 | A1 * | 4/2006 | Kawakami | 74/502.2 |

FOREIGN PATENT DOCUMENTS

| | | |
|---|---|---|
| GB | 488002 | 6/1938 |
| GB | 2169065 | 7/1986 |
| JP | 43-11680 | 5/1968 |
| JP | 48-24188 | 7/1973 |
| JP | 2-225191 | 9/1990 |

* cited by examiner

BICYCLE SHIFT DEVICE HAVING A LINEARLY SLIDING SHIFT LEVER OPERATED BY A PIVOTING COVER

Matter enclosed in heavy brackets [ ] appears in the original patent but forms no part of this reissue specification; matter printed in italics indicates the additions made by reissue.

BACKGROUND OF THE INVENTION

The present invention is directed to a bicycle shift control device which operates a shifting mechanism via a shift control cable, and specifically concerns a device in which a take-up body that takes up the shift control cable is caused to rotate in the take-up direction by means of a first shift lever which freely returns to a home position, and is caused to rotate in the pay-out direction by means of a second shift lever which freely returns to a separate home position.

A bicycle shift control device of the type noted above for operating a shifting mechanism via a shift control cable is disclosed in U.S. Pat. No. 5,921,138. The shift control device includes a control body for mounting to a bicycle in close proximity to a handlebar for controlling a pulling and releasing of the shift control cable. A first lever is mounted to the control body for movement which causes the control body to effect pulling of the shift control cable, and a second lever is mounted to the control body for movement which causes the control body to effect releasing of the shift control cable. One lever is pivotally coupled to the control body, and the other lever is coupled for linear movement relative to the control body. The lever structured for linear movement is coupled to a transmission mechanism for operating the control body in such a way that very little linear movement is needed to operate the control body. The transmission mechanism includes a plurality of ratchet teeth disposed in a common plane, wherein the path of movement of the linear operating body is parallel to the plane of the ratchet teeth.

Since the linearly moving lever moves in a direction perpendicular to the handlebar, for optimum operation the rider must position his or her thumb directly in front of the linearly operating lever and press the lever in the direction perpendicular to the handlebar. However, during competitive riding the rider usually does not want to worry about having to precisely position the thumb to operate the shifting device. Thus, it is desirable to have a shift control device of the kind noted above wherein the rider does not have to precisely position the thumb in front of the linearly operating lever for optimum operation.

SUMMARY OF THE INVENTION

The present invention is directed to a bicycle shift control device which allows the shifting operation to be performed without requiring precision placement of the rider's hand. In one embodiment of the present invention, a bicycle shift control device is provided which operates a shifting mechanism via a shift control cable, wherein the shift control device includes a control body rotatable about an axis for controlling the shift control cable, an operating body having an abutment in a position spaced apart from the control body and which is coupled to the shift control device for displacement between a home position and a shift position, a transmission including a plurality of ratchet teeth which converts the displacement of the operating body from the home position to the shift position into a rotational displacement of the control body, and an interface member movably mounted relative to the operating body. The interface member has an operating force receiving surface and an operating force applying surface, wherein the operating force receiving surface is adapted to receive an operating force from the rider, and wherein the operating surface applying surface applies the operating force to the abutment of the operating body for moving the operating body from the home position to the shift position.

DETAILED DESCRIPTION OF THE EMBODIMENTS

Figure 1:
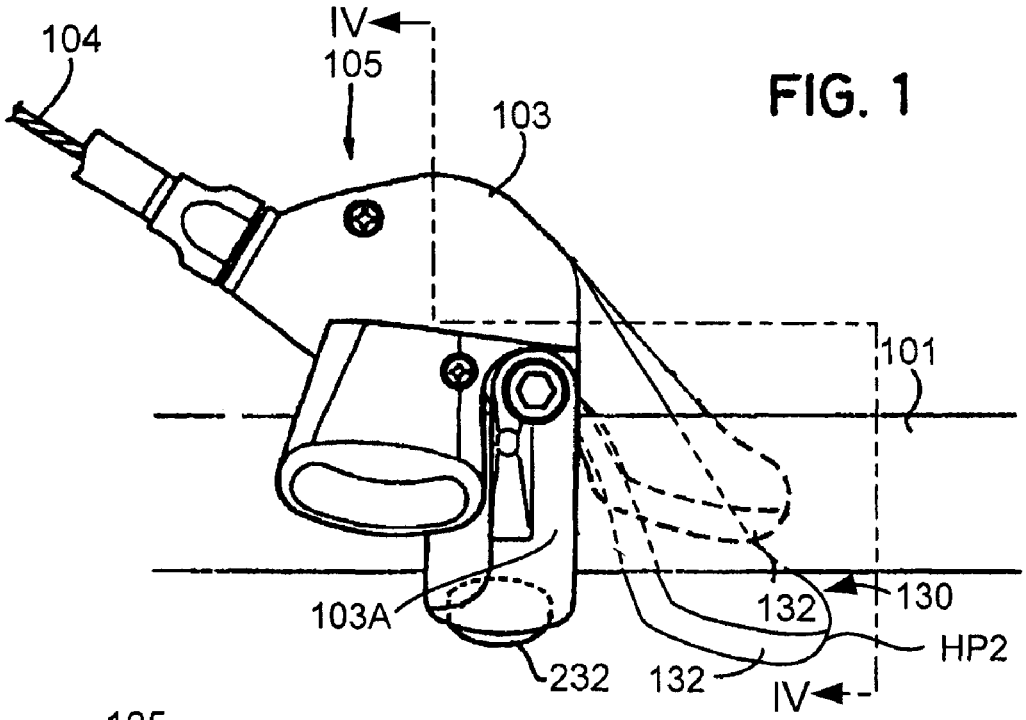
FIG. 1 is a top view of a particular embodiment of a shift control device according to the present invention attached to a handlebar.
Figure 2:
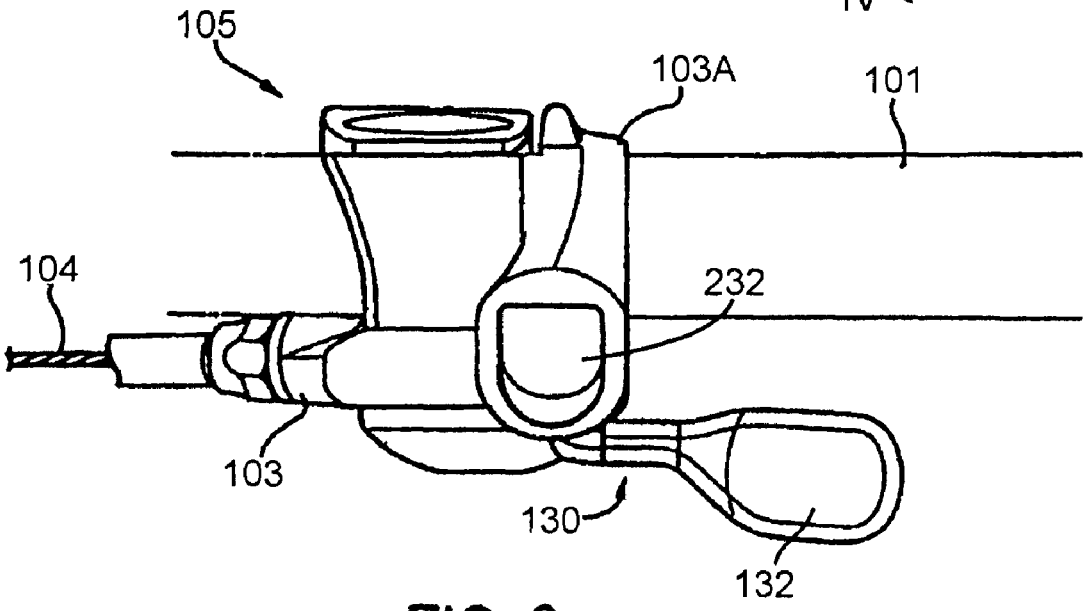
FIG. 2 is a front view of the shift control device.

FIGS. 1-7 are various views of a particular embodiment of a shift control device 105 according to the present invention. As shown in those Figures, shift control device 105 is constructed for pulling and releasing a shift control cable 104, and it includes a mounting bracket 103 with an annular mounting sleeve 103A defining a handlebar mounting axis (HB), wherein mounting sleeve 103A fits around a handlebar 101 to fasten bracket 103 to handlebar 101 in a known manner. An arm-shaped linearly sliding operating body 220 (FIGS. 4-7) of shift control device 105 is slidingly mounted to an intermediate bracket 227 attached to mounting bracket 103 through a screw 228. Sliding operating body 220 is located below handlebar 101 and terminates at an end 201 forming an abutment. An interface member in the form of an operating tab 202 with an operating force receiving surface 203, an operating force applying surface 204 and parallel spaced mounting ears 206 and 208 is pivotably coupled to corresponding parallel spaced mounting ears 210 and 212 on intermediate bracket 227 through a pivot shaft 216 and a C-clip 217, wherein pivot shaft 216 extends through openings 221, 222, 224 and 226 in mounting ears 206, 208, 210 and 212, respectively. A decorative cap 232 (FIGS. 1 and 2) having the same general structure as operating tab 202 also may be pivotably mounted to mounting ears 210 and 212 on intermediate bracket 227 or may be otherwise placed over operating tab 202 in order to vary the shape or inclination of the surface that is operated by the thumb.

A pivoting operating body 130 of the shift control device 105 also extends below the handlebar 101. A finger contacting part 132 of operating body 130, in the form of a button, is disposed beneath and to the right of operating tab 202. As a result, operation of both operating bodies is possible with the thumb of the hand gripping the handlebar 101.

Figure 3:
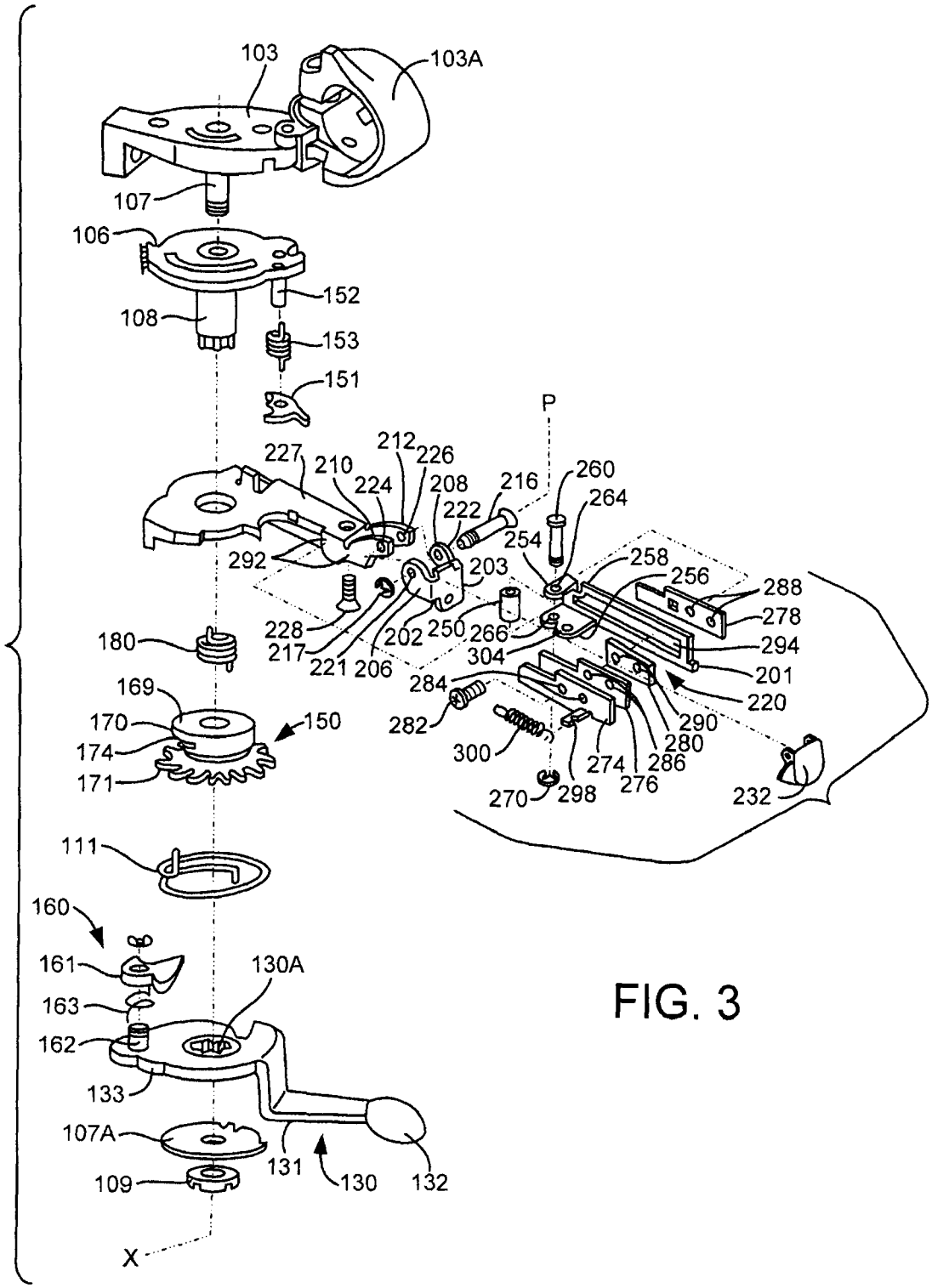
FIG. 3 is an exploded view of the shift control device.

As is shown in FIG. 3, shift control device 105 includes a pawl support plate 106 with a supporting shaft 108 and a pivot pin 152, all of which are rigidly fastened to bracket 103 by means of an attachment bolt 107, a washer 107a and a nut 109. A control body in the form of a take-up body 170 is mounted around supporting shaft 108 for rotation around an axis (X). A first ratchet mechanism 150, used as a first transmission means, transmits the displacement of sliding operating body 220 to the take-up body 170 to cause the rotation of the take-up body 170 in one direction, and a second ratchet mechanism 160, used as a second transmission means, transmits the displacement of pivoting operating body 130 to the take-up body 170 to cause the rotation of the take-up body 170 in the other direction. In this embodiment, displacement of pivoting operating body 130 causes the take-up body 170 to pull on cable 104, and displacement of sliding operating body 220 causes the. take-up body 170 to release cable 104.

Figure 5:
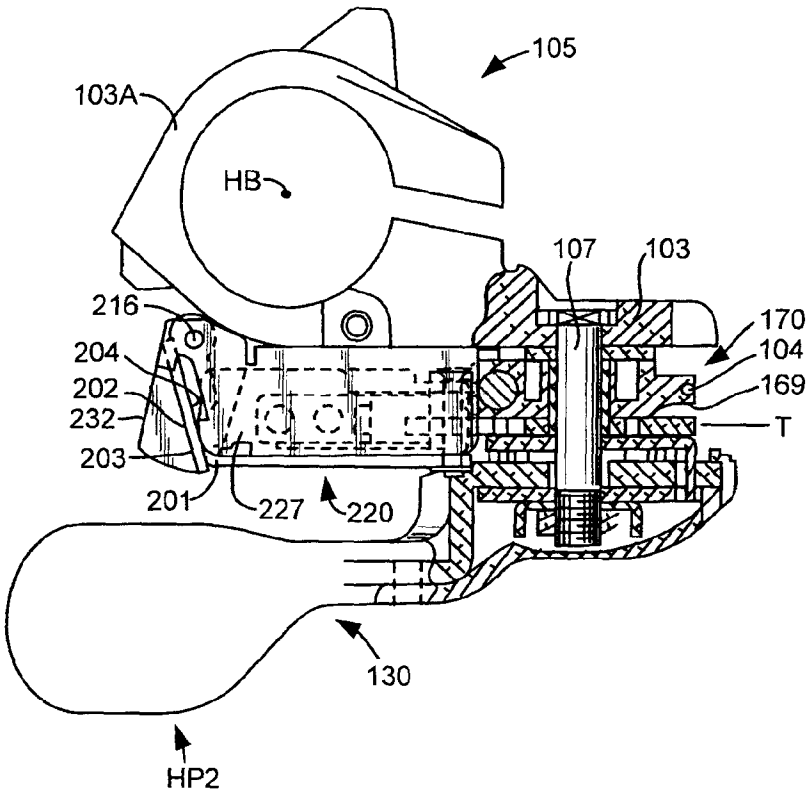
FIG. 5 is a *partial* cross sectional view of the shift control device*, as shown in FIG. 4,* showing the linearly operating body in an operating position*, wherein the hatching shown in FIG. 5, resulting from the use of a short line symbol superimposed perpendicular on each parallel oblique stroke, represents no specific material*.
Figure 4:
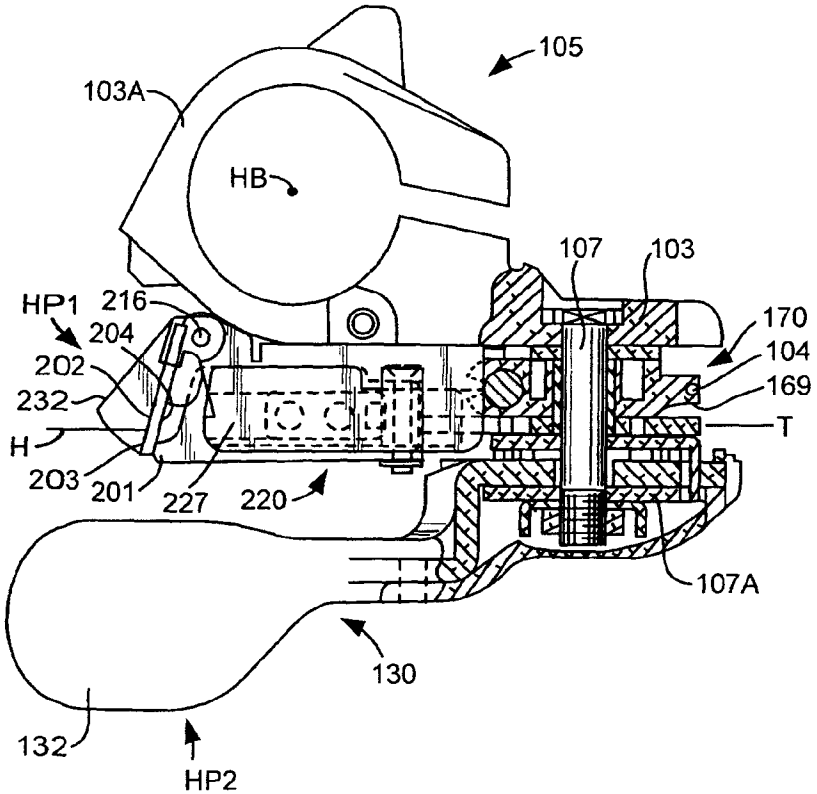
FIG. 4 is a *partial* cross sectional view of the shift control device*, taken along line IV-IV in FIG. 1,* in an inoperative state*, wherein the hatching shown in FIG. 4, resulting from the use of a short line symbol superimposed perpendicular on each parallel oblique stroke, represents no specific material*.
Figure 6:
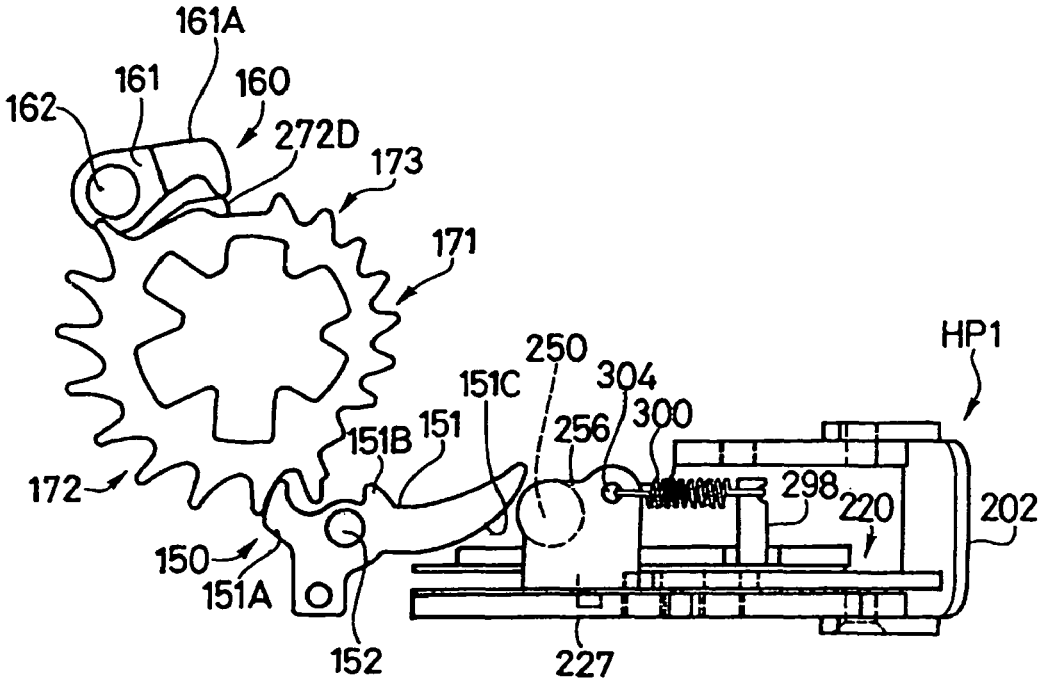
FIG. 6 is a detailed bottom view of the linearly operating body in a home position.
Figure 7:
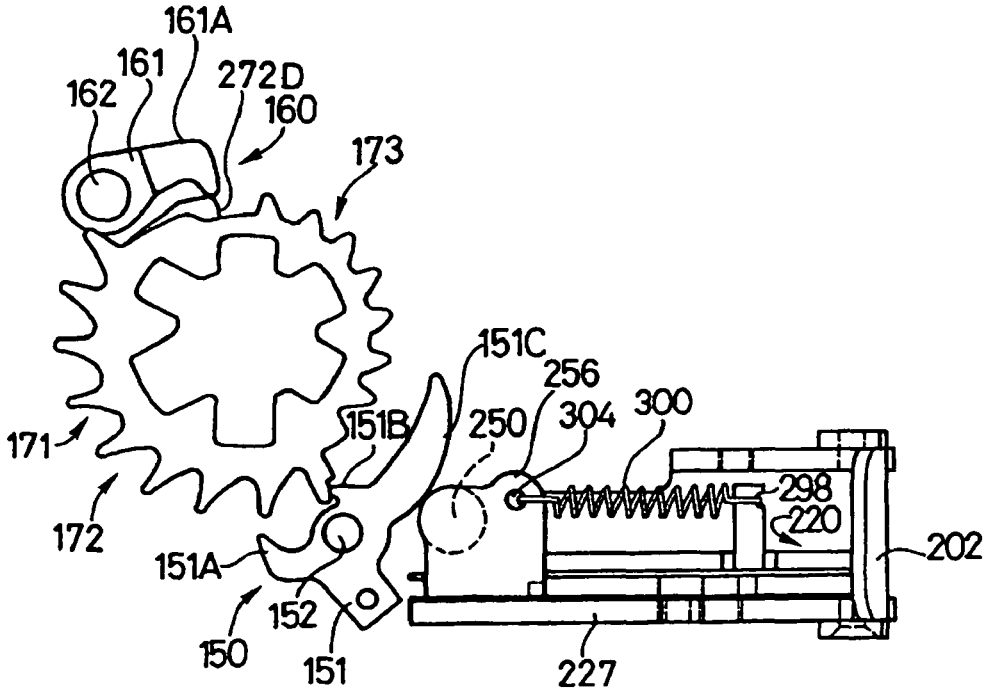
FIG. 7 is a detailed bottom view of the linearly operating body in an operating position.

The take-up body 170 is equipped with a drum part 169 which is constructed so that the shift control cable 104 from a shifting mechanism (not shown) on the front or rear of the bicycle is taken up along a wire groove 174. By rotating in the forward direction or reverse direction with respect to the supporting shaft 108, the take-up body 170 takes up or pays out the shift control cable 104. Take-up body 170 is coupled to a drive plate 171 for integral rotation therewith. As shown in FIGS. 6 and 7, drive plate 171 includes a plurality of drive teeth 173 and a plurality of position retaining teeth 172, all of which are disposed in a common plane T, as illustrated in FIGS. 4 and 5.

Sliding operating body 220 includes a pawl pushing roller 250 rotatably mounted between roller support ears 254 and 256 disposed at a pawl operating end 258 of sliding operating body 220 through a pivot shaft 260 and a C-clip 270, wherein pivot shaft 260 extends through openings 264 and 266 in mounting ears 254 and 256, respectively. Sliding operating body 220 is slidingly mounted to intermediate bracket 227 between a release plate 274, slide shims 276 and 278, and a release plate bushing 280, all of which are mounted to intermediate bracket 227 through bolts 282 (only one such bolt is shown in FIG. 3) that extend through openings 284, 286, 288 and 290 in release plate 274, slide shims 276 and 278 and release plate bushing 280, respectively, and through two pairs of opposed openings 292 (only two such openings are shown in FIG. 3) in intermediate bracket 227. Sliding operating body 220 also includes an elongated opening 294 for accommodating bolts 282 so that bolts 282 do not interfere with the sliding operation of sliding operating body 220.

Release plate 274 includes a spring coupling abutment 298. One end of a return spring 300 is attached to spring coupling abutment 298, and the other end of return spring 300 is attached to mounting ear 256 in sliding operating body 220 through an opening 304. Return spring 300 biases sliding operating body 220 toward a home position HP1 shown in FIGS. 4 and 6.

The first ratchet mechanism 150 comprises a first pawl 151 that is rotatably attached to pivot pin 152 extending from pawl support plate 106, the plurality of position retaining teeth 172 which are formed on the outer circumferential surface of the drive plate 171, and a spring 153 which drives the first pawl 151 clockwise (in FIGS. 6 and 7) in the direction of engagement with position retaining teeth 172. First pawl 151 includes pawl tips 151A and 151B for engaging position retaining teeth 172 and a pawl operating part 151C for engaging pawl pushing roller 250 on sliding operating member 220. The operation of first ratchet mechanism 150 is the same as in the shift control device disclosed in U.S. Pat. No. 5,921,138, incorporated herein by reference, so a detailed description of its operation shall be omitted. The path of motion of sliding operating body 220 is substantially parallel to the ratchet teeth plane T.

The pivoting operating body 130 is equipped with a second arm part 131, the second finger contact part 132 which is formed on the tip of the second arm part 131 in order to allow finger operation, and a pawl supporting part 133. A spring 111 is connected between washer 107A and pawl supporting part 133 for biasing pivoting operating body 130, and hence finger contacting part 132, to the home position HP2 shown in FIG. 4. The path of motion of pivoting operating body 130 is substantially parallel to the ratchet teeth plane T.

The second ratchet mechanism 160 comprises a second pawl 161 that is rotatably attached to a pivot pin 162 extending from pawl supporting part 133, the plurality of drive teeth 173 formed on the outer circumferential surface of the drive plate 171, and a spring 163 which biases the second pawl 161 clockwise (in FIGS. 6 and 7) in the direction of engagement with drive teeth 173. When pivoting operating body 130 is in the home position HP2 shown in FIGS. 4 and 5, a tip 161A of pawl 161 rests on a ledge 272D of intermediate bracket 227, thus uncoupling pawl 161 from drive plate 172. The operation of second ratchet mechanism 160 also is the same as the shift control device disclosed in U.S. Pat. No. 5,921,138, so a detailed description of its operation shall be omitted.

Because sliding operating body 220 operates pawl 151 by pressing pawl pressing roller 250 against pawl operating part 151 C, very little movement (e.g., 9 millimeters) is required to operate pawl 151. Operating force receiving surface 203 of operating tab 202 is inclined relative to a horizontal axis H which, in this embodiment, is parallel to ratchet teeth plane T. Thus, operating tab 202 will pivot counterclockwise as shown in FIGS. 4 and 5 even if the rider's thumb applies a vertically downward force. As a result of the small movement required to operate pawl 151 and the inclined nature of operating tab 202, operating tab 202 may operate sliding operating body 220 without requiring the rider to press perpendicular to the handlebar and without precision placement of the rider's thumb. Indeed, sliding operating body 220 could be operated even by a downward sliding motion of the thumb across the front face of shift control device 105.

While the above is a description of various embodiments of the present invention, further modifications may be employed without departing from the spirit and scope of the present invention. For example, operating body 220 may cause take-up body 170 to rotate in the cable pay out direction, and operating body 130 may cause take-up body 170 to rotate in the cable take-up direction. If desired, operating body 220 may be constructed for pivoting displacement, and operating body 130 may be constructed for sliding displacement with the operating tab 202 described above. Both operating bodies 220 and 130 may be sliding operating bodies, each with their own operating tab. While the path of movement of sliding operating body 220 in the above embodiment is substantially parallel to the plane of the ratchet teeth T, the path may vary, for example, by plus or minus thirty degrees.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle shift control device which operates a shifting mechanism via a shift control cable, the shift control device comprising:

a control body rotatable about an axis (X) for controlling the shift control cable;

a mounting member adapted to mount the shift control device to a handlebar, wherein the mounting member defines a handlebar mounting axis (HB);

wherein the axis (X) is oriented substantially perpendicular to the handlebar mounting axis (HB);

an operating body having an abutment in a position spaced apart from the control body and which is coupled to the shift control device for displacement between a home position and a shift position;

wherein the operating body moves linearly in a straight line between the home position and the shift position;

a transmission which converts the displacement of the operating body from the home position to the shift position into a rotational displacement of the control body, wherein the transmission includes a plurality of ratchet teeth; and an interface member movably mounted relative to the operating body and having an operating force receiving surface and an operating force applying surface, wherein the operating force receiving surface is adapted to receive an operating force from a rider, and wherein the operating force applying surface applies the operating force to the abutment of the operating body for moving the operating body from the home position to the shift position.

2. The device according to claim 1 wherein the operating force-receiving surface is inclined relative to a horizontal axis (H).

3. The device according to claim 2 wherein the plurality of ratchet teeth are disposed in a ratchet teeth plane (T), and wherein the horizontal axis (H) is parallel to the ratchet teeth plane (T).

4. The device according to claim 1 wherein the operating body is movably retained to an intermediate mounting member, and wherein the interface member is coupled to the intermediate mounting member.

5. The device according to claim 4 wherein the interface member is pivotably coupled to the intermediate mounting member.

6. The device according to claim 5 wherein the operating force receiving surface is inclined relative to a horizontal axis (H).

7. The device according to claim 6 wherein the plurality of ratchet teeth are disposed in a ratchet teeth plane (T), and wherein the horizontal axis (H) is parallel to the ratchet teeth plane (T).

8. A bicycle [shifter] *shift* control device which operates a shifting mechanism via a shift control cable, the shift control device comprising:

a control body rotatable about an axis (X) for controlling the shift control cable;

a mounting member adapted to mount the shift control device to a handlebar, wherein the mounting member defines a handlebar mounting axis (HB);

wherein the axis (X) is oriented substantially perpendicular to the handlebar mounting axis (HB);

a linear operating body which forms an abutment in a position spaced apart from the control body and which is coupled to the [operating] *shift control* device for linear displacement between a first home position and a first shift position;

an interface member movably mounted relative to the linear operating body and having a first finger contact and an operating force applying surface, wherein the operating force applying surface applies [the] *an* operating force to the abutment of the linear operating body for moving the linear operating body from the first home position to the first shift position;

a second operating body which forms a second finger contact part in a position spaced apart from the control body and which is coupled to the [operating] *shift control* device for displacement between a second home position and a second shift position;

a first transmission which converts the linear displacement of the linear operating body from the first home position to the first shift position into a rotational displacement of the control body, wherein the first transmission includes a plurality of ratchet teeth disposed in a ratchet teeth plane (T);

a second transmission which converts the displacement of the second operating body from the second home position to the second shift position into a rotational displacement of the control body; and wherein a path of movement of the linear operating body is substantially parallel to the ratchet teeth plane (T).

9. The device according to claim 8 wherein the operating force [receiving] *applying* surface is inclined relative to a horizontal axis (H).

10. The device according to claim 9 [wherein the plurality of ratchet teeth are disposed in a ratchet teeth plane (T), and] wherein the horizontal axis (H) is parallel to the ratchet teeth plane (T).

11. The device according to claim 8 wherein the *linear* operating body is movably retained to an intermediate mounting member, and wherein the interface member is coupled to the intermediate mounting member.

12. The device according to claim 11 wherein the *linear* operating body moves linearly in a straight line between the *first* home position and the *first* shift position.

13. The device according to claim 12 wherein the interface member is pivotably coupled to the intermediate mounting member.

14. The device according to claim 13 wherein the operating force [receiving] *applying* surface is inclined-relative to a horizontal axis (H).

15. The device according to claim 14 [wherein the plurality of ratchet teeth are disposed in a ratchet teeth plane (T), and] wherein the horizontal axis (H) is parallel to the ratchet teeth plane (T).

16. A bicycle shift control device which operates a shifting mechanism via a shift control cable, the shift control device comprising:

a control body rotatable about an axis (X) for controlling the shift control cable;

an operating body having an abutment in a position spaced apart from the control body and which is coupled to the shift control device for displacement between a home position and a shift position;

wherein the operating body includes a roller for controlling the operation of the control body;

a transmission which converts the displacement of the operating body from the home position to the shift position into a rotational displacement of the control body, wherein the transmission includes a plurality of ratchet teeth; and an interface member movably mounted relative to the operating body and having an operating force receiving surface and an operating force applying surface, wherein the operating force receiving surface is adapted to receive an operating force from a rider, and wherein the operating force applying surface applies the operating force to the abutment of the operating body for moving the operating body from the home position to the shift position.

17. A bicycle [shifter] *shift* control device which operates a shifting mechanism via a shift control cable, the shift control device comprising:

a control body rotatable about an axis (X) for controlling the shift control cable;

a mounting member adapted to mount the shift control device to a handlebar and defining a handlebar mounting axis (HB);

wherein the axis (X) is substantially perpendicular to the handlebar mounting axis (HB);

a linear operating body which forms an abutment in a position spaced apart from the control body and which is coupled to the [operating] *shift control* device for linear displacement between a first home position and a first shift position;

wherein the linear operating body includes a roller for controlling the operation of the control body;

an interface member movably mounted relative to the linear operating body and having a first finger contact and an operating force applying surface, wherein the operating force applying surface applies [the] *an* operating force to the abutment of the linear operating body for moving the linear operating body from the first home position to the first shift position;

a second operating body which forms a second finger contact part in a position spaced apart from the control body and which is coupled to the [operating] *shift control* device for displacement between a second home position and a second shift position;

a first transmission which converts the linear displacement of the linear operating body from the first home position to the first shift position into a rotational displacement of the control body, wherein the first transmission includes a plurality of ratchet teeth disposed in a ratchet teeth plane (T);

a second transmission which converts the displacement of the second operating body from the second home position to the second shift position into a rotational displacement of the control body; and wherein a path of movement of the linear operating body is substantially parallel to the ratchet teeth plane (T).

18. A bicycle shift control device which operates a shifting mechanism via a shift control cable, the shift control device comprising:

a control body rotatable about an axis (X) for controlling the shift control cable;

an operating body having an abutment in a position spaced apart from the control body and which is coupled to the shift control device for displacement between a home position and a shift position;

a transmission which converts the displacement of the operating body from the home position to the shift position into a rotational displacement of the control body, wherein the transmission includes a plurality of ratchet teeth; and an interface member movably mounted relative to the operating body and having an operating force receiving surface and an operating force applying surface, wherein the operating force receiving surface is adapted to receive an operating force from a rider, and wherein the interface member pivots so that the operating force applying surface applies the operating force to the abutment of the operating body for moving the operating body from the home position to the shift position.

19. A bicycle [shifter] *shift* control device which operates a shifting mechanism via a shift control cable, the shift control device comprising:

a control body rotatable about an axis (X) for controlling the shift control cable;

a linear operating body which forms an abutment in a position spaced apart from the control body and which is coupled to the [operating] *shift control* device for linear displacement between a first home position and a first shift position;

an interface member movably mounted relative to the linear operating body and having a first finger contact and an operating force applying surface, wherein the interface member pivots so that the operating force applying surface applies [the] *an* operating force to the abutment of the linear operating body for moving the linear operating body from the first home position to the first shift position;

a second operating body which forms a second finger contact part in a position spaced apart from the control body and which is coupled to the [operating] *shift control* device for displacement between a second home position and a second shift position;

a first transmission which converts the linear displacement of the linear operating body from the first home position to the first shift position into a rotational displacement of the control body, wherein the first transmission includes a plurality of ratchet teeth disposed in a ratchet teeth plane (T);

a second transmission which converts the displacement of the second operating body from the second home position to the second shift position into a rotational displacement of the control body; and wherein a path of movement of the linear operating body is substantially parallel to the ratchet teeth plane (T).

* * * * *